United States Patent
Green

[11] Patent Number: 5,151,146
[45] Date of Patent: Sep. 29, 1992

[54] METHOD OF MAKING A ROOFING LAMINATE INCLUDING A TRIAXIAL WOUND NONWOVEN FIBERGLASS SCRIM

[75] Inventor: David E. Green, Mauldin, S.C.

[73] Assignee: Milliken Research Corporation, Spartanburg, S.C.

[21] Appl. No.: 712,289

[22] Filed: Jun. 10, 1991

Related U.S. Application Data

[62] Division of Ser. No. 679,194, Apr. 2, 1991, Pat. No. 5,108,831.

[51] Int. Cl.⁵ .................................................. B32B 5/12
[52] U.S. Cl. .................................. 156/177; 156/176; 156/324; 156/439; 28/101
[58] Field of Search ............... 156/148, 176, 177, 178, 156/324, 296, 180, 181, 439; 428/257, 246; 28/101

[56] References Cited

U.S. PATENT DOCUMENTS

| | | | |
|---|---|---|---|
| 3,459,615 | 8/1969 | Eilerman | 28/101 X |
| 3,644,165 | 2/1972 | Chen | 156/177 X |
| 4,010,306 | 3/1977 | Fagan | 156/176 X |
| 4,020,209 | 4/1977 | Yuan | 428/257 |
| 4,080,232 | 3/1978 | Friedrich | 28/101 X |
| 4,278,720 | 7/1981 | Shannon . | |
| 4,301,204 | 11/1981 | McCusker et al. | 428/257 X |
| 4,368,228 | 1/1983 | Gorgati | 428/247 X |
| 4,491,617 | 1/1985 | O'Connor et al. | 156/282 X |
| 4,539,254 | 9/1985 | O'Connor et al. | 156/282 X |
| 4,762,744 | 8/1988 | Woieceshyn et al. . | |
| 4,780,350 | 10/1988 | O'Connor et al. | 156/148 X |
| 4,789,578 | 12/1988 | Twyford et al. . | |
| 5,057,172 | 10/1991 | Woiceshyn | 156/324 X |

FOREIGN PATENT DOCUMENTS

| | | |
|---|---|---|
| 830467 | 12/1969 | Canada . |
| 2379376 | 10/1978 | France . |
| 1226378 | 3/1971 | United Kingdom . |

*Primary Examiner*—Jeff H. Aftergut
*Attorney, Agent, or Firm*—Earle R. Marden; H. William Petry

[57] ABSTRACT

Method to produce a roofing membrane for use in the construction of roofs which comprises mating of at least two plys of fiberglass scrim fabric to form a substrate for the roofing membrane. At least one of the plys of the substrate is a triaxially wound scrim fabric to provide additional strength to a standard open mesh rectangular formed scrim fabric.

1 Claim, 3 Drawing Sheets

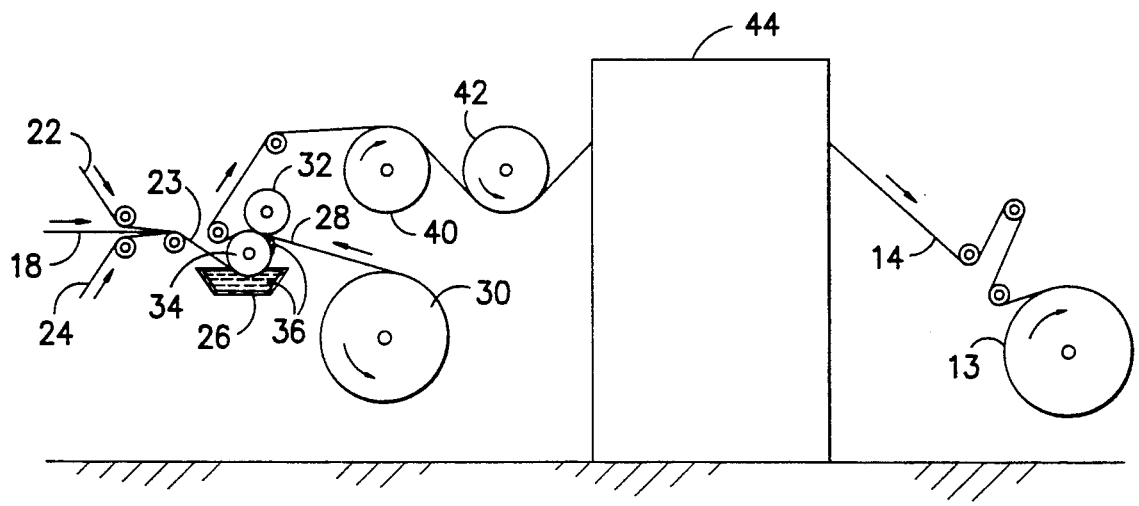
FIG. -1-
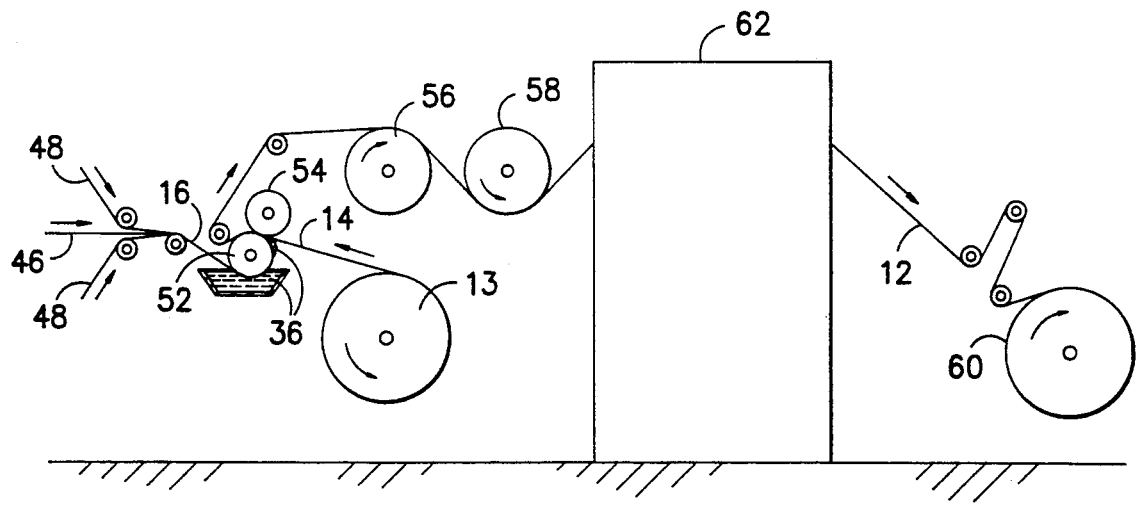
FIG. -2-

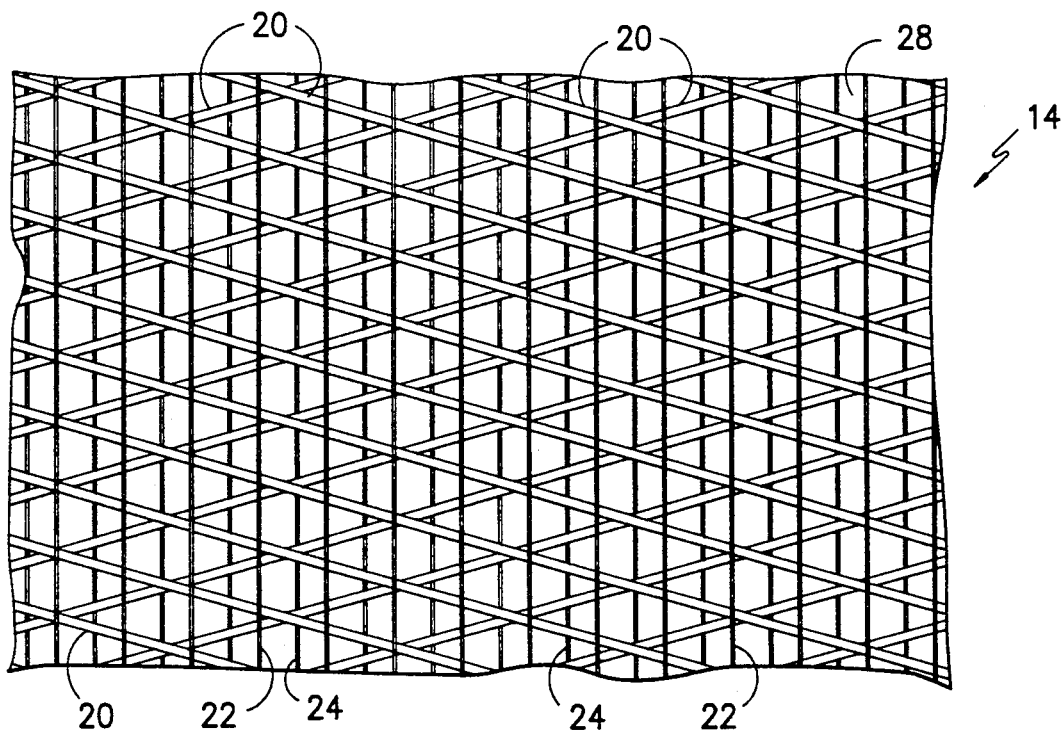
FIG. -3-
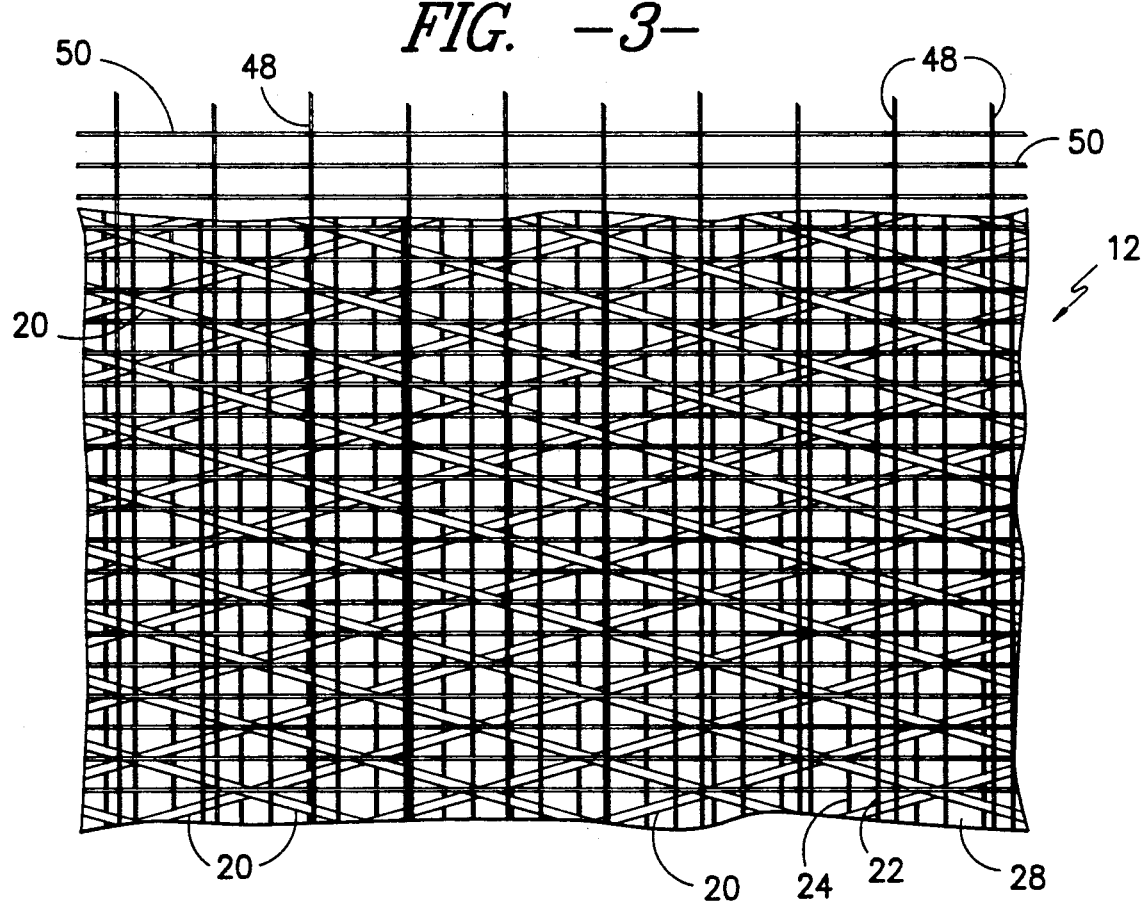
FIG. -4-

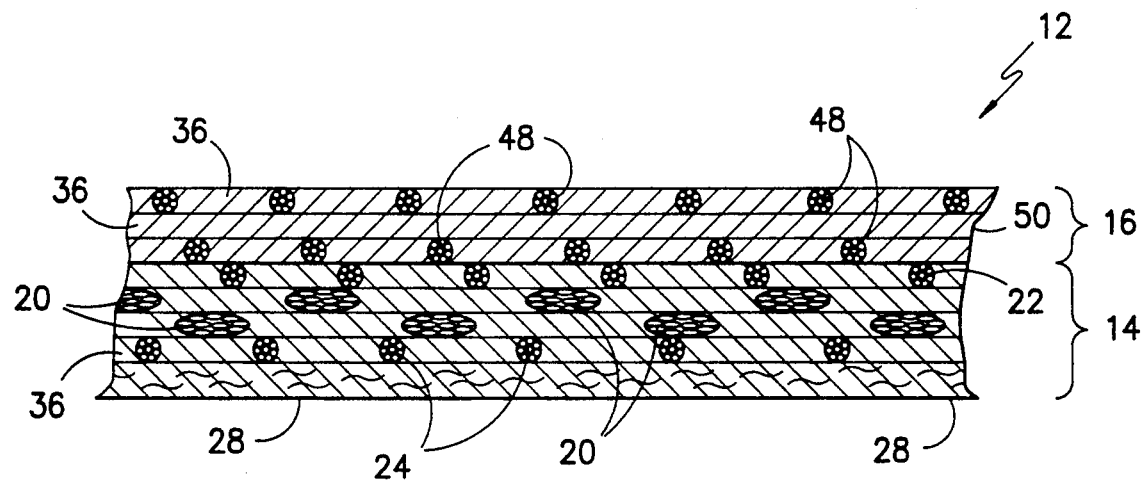
FIG. —5—
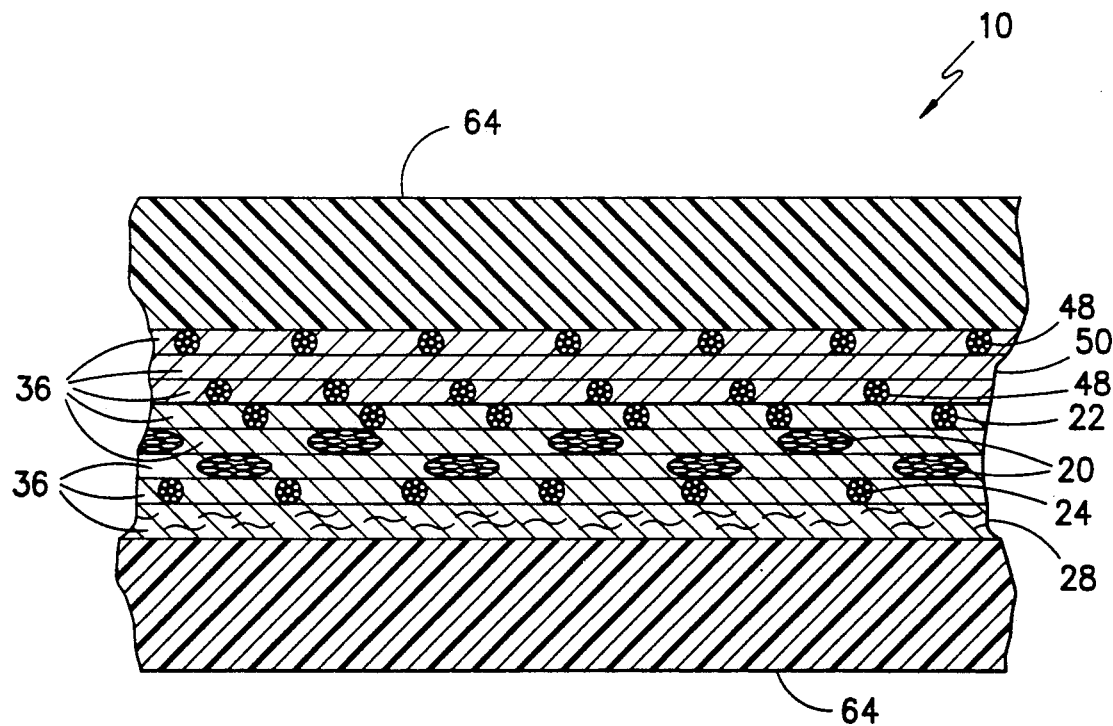
FIG. —6—

METHOD OF MAKING A ROOFING LAMINATE INCLUDING A TRIAXIAL WOUND NONWOVEN FIBERGLASS SCRIM

This is a division of application Ser. No. 679,194 filed Apr. 2, 1991 now U.S. Pat. No. 5,108,831 for ROOFING MATERIAL.

This invention relates to a new and improved substrate for bituminous roofing membranes which are readily manufactured, flexible, capable of being impregnated by bituminous material and having sufficient strength to be useful in reinforcing roofing membranes.

Prior to this invention a single ply fiberglass scrim fabric laminated to a porous nonwoven fiberglass mat was used as a substrate for a bituminous roofing member but was found to be lacking in directionally uniform strength and integrity. To overcome this problem and provide a membrane which can be readily manufactured with a minimum of processing steps and handling, the herein-disclosed bituminous roofing membrane was developed.

Therefore, it is an object of the invention to provide a two-ply fiberglass substrate for bituminous roofing membrane which can be readily manufactured, is structurally strong and provides increased service life.

Other objects and advantages of the invention will become readily apparent as the specification proceeds to describe the invention with reference to the accompanying drawings, in which:

FIGS. 1 and 2 are schematic representations of the processes, respectively, to produce the substrate shown in FIG. 3 and FIGS. 4 and 5;

FIG. 3 is a top view of the scrim material manufactured by the process of FIG. 1;

FIG. 4 is a top view of the scrim material manufactured by the process of FIG. 2;

FIG. 5 is a cross-section view of the scrim material shown in FIG. 4 and

FIG. 6 is a view like FIG. 5 with the bituminous material coated thereon to form a bituminous roofing material.

In the manufacture of roofing membranes, a reinforcing sheet is saturated with bituminous material by leading the sheet through a tank or vat of bituminous material heated to about 275° to 425° F. (135° to 220° C.) using methods which are known in the art. This invention may also be utilized with cold mastics, i.e., materials which will not come into contact with hot coatings either in the coating process or during application to a roof. The resulting roofing membranes are rolled up for later installation, principally on flat roofs using additional bituminous material or a torch or other source of heat to seal the membrane and the joints. The bituminous material used in making these membranes is often a "modified bituminous" such as asphalt combined with about 20% by weight of atactic polypropylene or 5 to 15% styrene butadiene block copolymer rubber. This invention relates to a new form of composite sheet for use in reinforcing such membranes.

Looking now to the drawings the new and improved roofing member 10 is shown in FIG. 6 incorporating the substrate 12 shown in FIGS. 4 and 5. The substrate 12 is manufactured in a two-step process with the first ply 14 (FIG. 3) made as shown schematically in FIG. 1 and the final substrate 12 made as represented schematically in FIG. 2. The substrate 12, if desired, can be made in a one-step process merging the steps shown in FIGS. 1 and 2 and eliminating the take-up 13 of the fabric 14. As described above, the substrate 12 is treated to provide the roofing membrane 10.

The first ply 14 consists of a 1000 denier continuous filament selvage yarn 18 around which the fiberglass yarn 20 is triaxially wound in a manner generally disclosed in U.S. Pat. No. 3,422,511 or U.S. Pat. 4,242,779 producing a nonwoven scrim. Looking at FIG. 1 the triaxially wound fiberglass is delivered between the fiberglass warp yarns 22 and 24 to form a yarn sheet 23 and then passed through the adhesive bath 26. After the yarn sheet 23 passes through the adhesive bath 26 it is mated with a web of nonwoven fiberglass 28, from the roll 30, in the nip of rolls 32 and 34. The web of nonwoven fiberglass 28 picks up adhesive 36 from the bath 36 in the roll 32 as it mates with the yarn sheet 23. The adhesive 36 can be any resin which provides stiffness, improves water resistance and bonds upon the application of heat as the ply 14 passes over the steam cans 40 and 42 and through the oven 44 to the take-up roll 13. Such an adhesive is typically a polyvinyl alcohol or cross-linked acrylic latex resin readily available from a number of manufacturers such as Rohm & Haas.

The roll 13 of the first ply 14 is placed as noted in FIG. 2 and is laminated to the sheet 16 formed from selvage yarns 46, warp yarns 48 and weft yarns 50 in a manner generally disclosed in U.S. Pat. No. 3,608,164 to form an open mesh construction with rectangular or square openings between adjacent yarns. As in FIG. 1 the first ply 14 is mated with the sheet 16 in the nip of rolls 52 and 54 and passed over steam cans 56 and 58 to the take-up roll 60 through the oven 62. The resulting laminated fabric 12 is treated as mentioned previously to form the roof membrane 10 with bituminous-type material 64 on both sides thereof.

In the preferred form of the invention both of the selvage yarns 18 and 46 are cut out before formation of the roofing membrane but are necessary in the formation of the substrate plys 14 and 16. In the first ply 14 the selvage yarn 18 is 1000 denier polyester while in the second ply 16 the selvage yarn 46 is 624 denier fiberglass. In the first ply 14 warp yarns 22 and 24 are 1207 denier fiberglass while the fill yarns 20 are 2480 denier fiberglass. In the second ply 16 the warp yarns 48 and the weft yarns 50 are 624 denier fiberglass.

As can be seen in FIGS. 4 and 6 the roofing member substrate 12 is composed basically of two plys 14 and 16 of fiberglass scrim fabric laminated together to provide strength and rigidity to the roofing member 10. As herein-described the first ply 14 is triaxially wound to provide strength in the angular direction which would tend to distort the second ply 16 if used by itself. The plys 14 and 16 complement one another to provide resistance to distortion in four directions rather than in two directions for fabrics such as ply 16 alone.

Although the preferred embodiment of the invention has been described it is contemplated that changes may be made within the scope of the invention and it is desired that the invention be limited only by the scope of the claims.

What is claimed is:

1. The method of manufacturing a roofing membrane comprising the steps of: supplying a triaxially wound nonwoven fiberglass scrim fabric, adhering a nonwoven fiberglass mat to the triaxially wound scrim fabric, supplying a second open mesh nonwoven fiberglass scrim fabric, laminating the second scrim fabric to the triaxial wound scrim fabric and saturating the laminate scrim fabric with a bituminous material to provide a roof membrane.

* * * * *